(12) United States Patent
Leinhart et al.

(10) Patent No.: US 10,215,563 B2
(45) Date of Patent: *Feb. 26, 2019

(54) SURVEYING INSTRUMENT

(71) Applicant: LEICA GEOSYSTEMS AG, Heerbrugg (CH)

(72) Inventors: Werner Leinhart, Graz (AT); Hans-Martin Zogg, Uttwil (CH); Norbert Kotzur, Alstaetten (CH); Daniel Nindl, Feldkirch (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,481

(22) Filed: Jun. 5, 2017

(65) Prior Publication Data

US 2017/0268876 A1 Sep. 21, 2017

Related U.S. Application Data

(63) Continuation of application No. 13/582,392, filed as application No. PCT/EP2011/057696 on May 12, 2011.

(30) Foreign Application Priority Data

May 12, 2010 (EP) .................................... 10162748

(51) Int. Cl.
*G01C 15/00* (2006.01)
*G01C 1/04* (2006.01)
*G02B 23/10* (2006.01)

(52) U.S. Cl.
CPC ............... *G01C 15/00* (2013.01); *G01C 1/04* (2013.01); *G02B 23/105* (2013.01)

(58) Field of Classification Search
CPC .......... G01S 17/189; G01S 17/42; G01S 7/51; G01C 11/00; G01C 15/00; G01C 1/04;
(Continued)

(56) References Cited

U.S. PATENT DOCUMENTS 5,988,862 A 11/1999 Kacyra et al.
6,420,698 B1 7/2002 Dimsdale
(Continued)

FOREIGN PATENT DOCUMENTS

CN 1715829 A 1/2006
EP 1610092 A1 12/2005
(Continued)

OTHER PUBLICATIONS

European Search Report dated Oct. 13, 2010 as received in application No. 10 16 2748.
(Continued)

*Primary Examiner* — Brian P Yenke
(74) *Attorney, Agent, or Firm* — Maschoff Brennan

(57) ABSTRACT

The invention relates to a surveying instrument comprising a telescope, at least one camera providing first, second or more image signals and a controller, wherein the controller is adapted to combine the image signal data of the first, second or more image signals in order to simultaneously display at least two of the images corresponding to the first, second or more image signals on display means.

18 Claims, 4 Drawing Sheets

(58) Field of Classification Search
CPC ............... G01C 11/02; H04N 5/23293; H04N 5/523216
See application file for complete search history.

(56) References Cited

U.S. PATENT DOCUMENTS

| | | | |
|---|---|---|---|
| 6,563,574 | B2 | 5/2003 | Ohtomo et al. |
| 6,859,269 | B2 | 2/2005 | Ohtomo et al. |
| 7,081,917 | B2 | 7/2006 | Shimoyama et al. |
| 7,177,016 | B2 | 2/2007 | Ohtomo et al. |
| 7,564,488 | B2 | 7/2009 | Kumagai et al. |
| 7,930,835 | B2 | 4/2011 | Svanholm et al. |
| 8,300,986 | B2 | 10/2012 | Kochi et al. |
| 9,189,858 | B2 | 11/2015 | Svanholm et al. |
| 2002/0018122 | A1 | 2/2002 | Marold et al. |
| 2003/0048355 | A1* | 3/2003 | Shimoyama ............ G01C 15/00 348/79 |
| 2003/0137646 | A1 | 7/2003 | Hoffman et al. |
| 2003/0210329 | A1 | 11/2003 | Aagaard et al. |
| 2004/0145655 | A1 | 7/2004 | Tomita |
| 2004/0234123 | A1 | 11/2004 | Shirai et al. |
| 2005/0018279 | A1 | 1/2005 | Johnson |
| 2005/0057745 | A1 | 3/2005 | Bontje |
| 2005/0069195 | A1 | 3/2005 | Uezono et al. |
| 2005/0117215 | A1 | 6/2005 | Lange |
| 2005/0134719 | A1 | 6/2005 | Beck |
| 2005/0207621 | A1 | 9/2005 | Murai et al. |
| 2005/0223337 | A1 | 10/2005 | Wheeler et al. |
| 2005/0275829 | A1* | 12/2005 | Kumagai ............ G01C 15/002 356/139 |
| 2006/0188143 | A1 | 8/2006 | Strassenburg-Kleciak |
| 2006/0192946 | A1 | 8/2006 | Walser |
| 2007/0008515 | A1 | 1/2007 | Otani et al. |
| 2007/0279494 | A1 | 12/2007 | Aman et al. |
| 2008/0120855 | A1 | 5/2008 | Matsuo et al. |
| 2008/0154538 | A1 | 6/2008 | Stathis |
| 2008/0205707 | A1 | 8/2008 | Braunecker et al. |
| 2009/0220144 | A1 | 9/2009 | Mein et al. |
| 2009/0251482 | A1 | 10/2009 | Kondo et al. |
| 2010/0088910 | A1 | 4/2010 | Svanholm et al. |
| 2010/0188579 | A1 | 7/2010 | Friedman |
| 2010/0209090 | A1 | 8/2010 | Kludas |

FOREIGN PATENT DOCUMENTS

| | | |
|---|---|---|
| EP | 1744122 A2 | 1/2007 |
| JP | 03-041307 A | 2/1991 |
| JP | 2001-074455 A | 3/2001 |
| JP | 2002-202126 A | 7/2002 |
| JP | 2003-240548 A | 8/2003 |
| KR | 100170930 B1 | 10/1998 |
| WO | 2007/031248 A2 | 3/2007 |

OTHER PUBLICATIONS

International Search Report and Written Opinion dated Jul. 13, 2011 in application No. PCT/EP2011/057696.
EP Office Action dated Aug. 27, 2015 as received in Application No. 11719021.5.
Topcon: "Reference Manual—Imaging Station IS—TopSURV OnBoard for IS—1. Function," Dec. 31, 2007, pp. 1-66.
Topcon: "Reference Manual—Imaging Station IS—TopSURV OnBoard for IS—2. Observation." Dec. 31, 2007, pp. 1-86.
Topcon: "Reference Manual—Imaging Station IS—TopSURV OnBoard for IS—3. Scanning," Dec. 31, 2007, pp. 1-25.
Anonymous, IS Imaging Station, Topcon Corporation, 2008, <http://www.topcon-positioning.eu/UserFiles/files/2.%20Leaflets%20Imaging/Leaflet%20Imaging%20Station/Leaflet%20-%20IS-3%20-%20English%final.pdf>.
Anonymous, 'Powershot G11 Camera User Guide', Canon Inc. 2009 <http://gdlp01.c-wss.com/s/6/0300002536/03/PSG11_CUG_EN_03.pdf>.

* cited by examiner

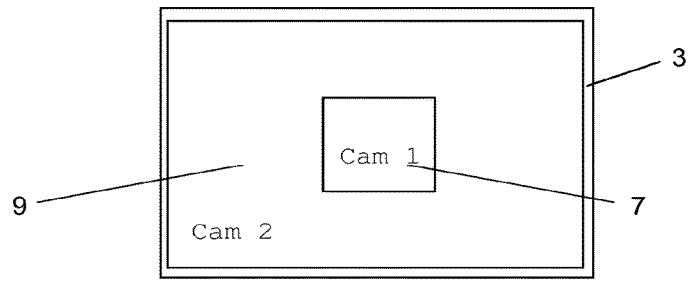
1. Surveying instrument
2. Camera
3. Display means
5. Keyboard
7. Image
9. Overview image
T. Target point
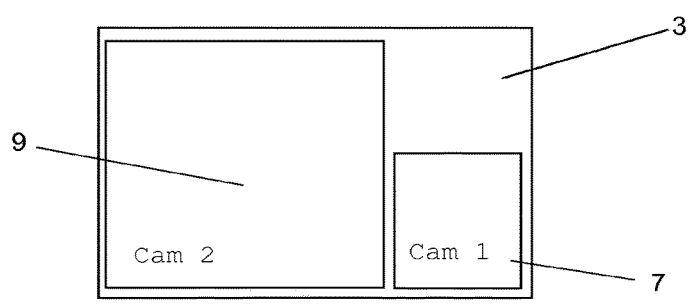
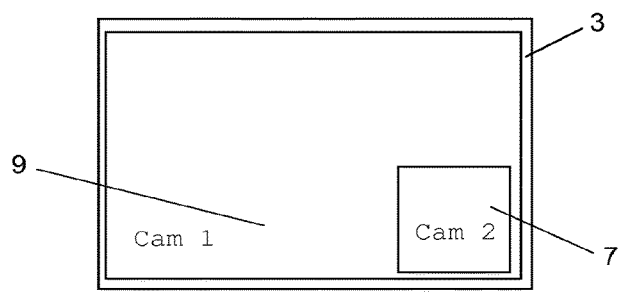

*Fig. 3*
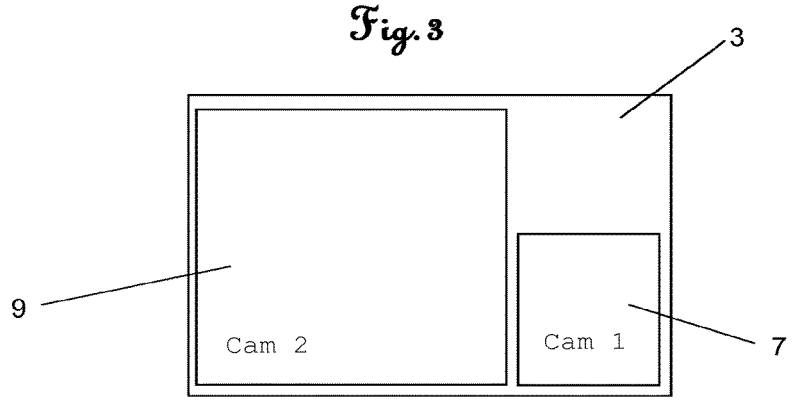
1. Surveying instrument
2. Camera
3. Display means
5. Keyboard
7. Image
9. Overview image
T. Target point
Double clicking on video-stream of camera 1
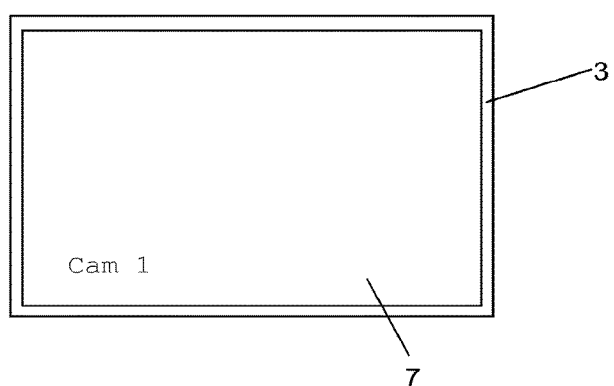

1. Surveying instrument
2. Camera
3. Display means
5. Keyboard
7. Image
9. Overview image
T. Target point

SURVEYING INSTRUMENT

CROSS-REFERENCE TO RELATED APPLICATIONS

This application is a continuation of U.S. patent application Ser. No. 13/582,392, which is the U.S. national stage of international patent application no. PCT/EP2011/057696, filed May 12, 2011, which claims priority to European patent application no. 10162748.7, filed May 12, 2010. The foregoing patent applications are incorporated herein by reference.

FIELD OF THE INVENTION

The invention relates to a surveying instrument and especially to a surveying instrument equipped with at least one camera and a display for displaying image information.

BACKGROUND

In order to aim a surveying instruments' telescope onto a predetermined target point it is known to use an overview image from a camera on a display. To verify the correct aiming at the target point, it is known to magnify a sector of the overview image. These two images can be alternatingly displayed according to an action of a user.

For example, document EP 1 610 092 A1 discloses a surveying instrument comprising first and second image pickup units. The second image picked up has a higher magnification than the first image picked up. When the first image is displayed on a display, its magnification can be digitally changed in a predetermined range. At an upper limit of the predetermined range effected by switching a zoom changeover switch, the second image is displayed. The magnification of the second image can be also digitally changed.

SUMMARY

When changing the zoom range to a large magnification, in cases where plural points resembling each other exist, it can be cumbersome to determine whether the magnified section of the image indeed corresponds to the desired section of the overview image and whether the correct target point is aimed at. Thus, switching back to the smaller zoom range might be necessary in order to accurately determine whether the correct target point is aimed at. Thus, there exists a need for a surveying instrument enabling a fast and accurate aiming of a telescope by a user.

According to the invention, a surveying instrument comprises a telescope, at least one camera providing first, second or more image signals, and a controlling unit for combining signal data. The image signals are combined by the controlling unit in order to be displayed as one image on display means at the surveying instrument and/or at a remote controller. The controlling unit is adapted to combine the image signal data of a first, second or more image signals to simultaneously display one, some or all of the images corresponding to the first, second or more image signals on the display means.

In other words, the surveying instrument, in particular theodolite or total station, comprises aiming means being swivelable in two directions with respect to a basis of the surveying instrument and comprising an objective unit defining an aiming axis and at least a first camera substantially in a direction of the aiming axis, wherein the at least first camera provides at least a first image signal. Moreover angle and distance measurement functionality for determination of the direction of the aiming axis and of a distance to a target, display means and a controlling unit are provided. The controlling unit is adapted so that the at least one image signal is processed in order to generate image signal data so that at least a first and a second image are displayed simultaneously, wherein each of the displayed images corresponds to one of the at least one image signals.

Furthermore, the aiming means comprise an on axis camera as the first camera, that is connected to the aiming means, with an optical magnification factor providing the first image signal and a wide angle camera with lower optical magnification factor as a second camera providing a second image signal and defining an optical axis.

Further, the surveying instrument is provided with imaging means, aiming means that are defining an aiming axis, distance measurement means and angle measurement means. Said means are turnable relatively to a base of the surveying instrument and, further, the imaging means comprise an on axis camera, that is connected to the aiming means, with an optical magnification factor and a wide angle camera with lower optical magnification factor, wherein a first image signal is provided by the on axis camera and a second image signal is provided by the wide angle camera.

Further, the at least one image signals of the on axis camera and the wide angle camera may be processed on side of the surveying instrument and the images displayed on the display means at the surveying instrument as one single image and/or the generated image signal data may be transferred to the remote controller and the corresponding image may be displayed on the display means at the remote controller. Alternatively, the image signals of the on axis camera and the wide angle camera may be transferred in parallel to the remote controller, processed on side of the remote controller so as to generate the image signal data and the at least first and second images may be displayed on the display means at the remote controller.

The main benefit and advantage of this invention is that the user has at least two video-streams simultaneously on the display whereas each of the video-streams contains different information. This information supports a fast and accurate aiming process of the telescope onto a target point by the user. Furthermore, an accurate and reliable target point aiming may need the different video-stream information simultaneously in order to clearly determine a unique target point. These can be e.g. video-streams of different wavelength spectrums or ATR-video-streams from a camera used for automatic target recognition (ATR), and WAC-video-streams (wide angle camera) without magnification. Thus, the invention provides a solution for the problem to properly select a desired target point.

Since the target point might be positioned close to another target point in a range where the user himself by using his eyes or the WAC (wide angle camera) cannot distinguish the target points anymore, the WAC and for instance an OAC video-stream (on-axis camera) with magnification or an ATR-camera video-stream are simultaneously available on the display means. Thus, while the WAC video-stream enables an overview of the scenery, while the OAC (or ATR-camera) allows the selection of the proper target point.

In order to explain the invention an example for working with the instrument is given. A user wants to measure one specific target within a group of targets, wherein the targets are hard to distinguish from each other by eye. The user directs a surveying instrument roughly onto the group of targets. On a display at the surveying instrument and on a display at a remote controller that is wirelessly connected to the instrument a real-time overview image of the environment onto that the instrument is directed is displayed. Further, a second real-time image captured by a second camera is displayed partly overlapping the overview image. The second image comprises a selected e.g. 20-times magnification of a part of the environment compared to the overview image. By touching on the overview image on the display the user defines an area the targets are located at. Afterwards, the instrument is directed to this area. The second image now shows this area in the selected magnification. Thereon, the targets are clearly separable from each other. The user now selects the target he is interested in on the second image. A mark representing the selected target is shown in the second and in the overview image and the target is clearly determined. Finally, the user may start a precise measurement of the selected target.

Thus, since the picture on the display consists of more than one image or image frames, respectively, a user of the surveying instrument can obtain information from all the displayed images at the same time. For instance an overview of the measurement scenery in one image frame and a detailed view of the target point in a second image frame can be available. Therefore, a fast and accurate determination whether the telescope is aimed at the correct target point can be made.

Particularly, some or all of the image signals can be at least parts of dynamic sequences of images or static images. The term image used herein may refer to a static image but also to a frame of a dynamic sequence of images, in particular a frame of a video stream. These streams can be raw video streams or compressed video streams (e.g. encoded in MPEG format). Using dynamic sequences, e.g. video streams, enables a real time judgment of the situation. With other words, the at least first image signal may represent a static image or at least parts of dynamic sequences of images, in particular may represent a video streams, in particular a real time (or substantially real time) video stream.

Furthermore, some or all of the image signals may be provided by separate cameras. Thus, different images and/or image frames from different cameras having different optical axes, different optical or digital zoom factors etc. can be combined in the one picture on the display.

Alternatively, some or even all of the image signals can be provided by the same camera. Especially when using different digital zoom factors with the same camera, exact real time magnifications of the sector or target point aimed at can be made.

The display means can be located directly at the surveying instrument. Alternatively the display means or additional display means can be located at a remote controller. Furthermore, additionally or alternatively, the display means can be implemented as an electro optical viewer in the surveying instrument.

Moreover, the at least first and/or second image may be updated on the display means with a refreshing frequency of 0.1-50 Hz and in particular may be updated in a continuous manner.

In a further embodiment of the invention, the real time video stream captured by an wide angle camera (having a comparatively wide field of view with no or low optical zoom factor) and the real time video stream captured by an on-axis camera being integrated into the surveying instruments' telescope having e.g. 30-fold magnification. While the wide angle camera provides an overview image of the whole measurement scenery, the on-axis camera provides a highly magnified image of an aimed sector in order to very precisely align the telescope with the target.

Furthermore, particularly, the controlling unit can be adapted to additionally process and/or combine information from one or more wavelength channels in order to display a combined image on the display means.

Particularly, the images corresponding to the first, second or more image signals can be arranged on the display means in an adjacent manner. Alternatively, or in combination therewith, one or some of the images corresponding to the first, second or more image signals can be arranged in a manner to partly or fully overlap one or some of the other images. Furthermore, the first image corresponding to the first, second or more image signals is a magnification of a detail of a second image being an overview image. Moreover, an overlapping of the at least first and second images is generated by displaying at least one of the images in the foreground in a semi-transparent manner.

Thereby, particularly, the magnified image can be provided by another camera than the overview image. For instance an overview image can be provided by a wide angle camera, while the magnification of the target sector can be provided by an on axis camera having a higher magnification. The magnified image can lay over the overview image so that the center of the magnified images corresponds to the center of the display means. The magnified image shows an area of the overview image corresponding to the center of the display means as well. An offset from the aiming axis to the optical axis may be considered for simultaneously displaying the first image and the second image. Alternatively, the one image and the overview image can be provided by the same camera. In this case, the two images are provided by using different digital zoom factors.

Furthermore, it can be advantageous, if one or some of the images are provided in defined wavelength channels, in particular color channels, and/or in adapted modes of representation, e.g. adapted by image processing. One or some of the images can be provided for instance in an infrared channel or in a night vision mode or in an edge representation mode. Thus, recognition and identification of the correct target point can be enhanced and facilitated.

Particularly, the display means can be provided with input means for manually changing the arrangement of the images and for marking and/or selecting points. For instance, the input means can be a touch display, or there can be control buttons, a keyboard or a control stick provided. Furthermore, a combination of one more or all of these input means is possible.

By use of the input means, for instance, it can be possible to increase the size of one or some of the images or even to fade out one or some of the images. Furthermore, it can be possible to control the presentation on the display means, for example to control the size of the single images, the kind of arrangement of the single images, the presented images, to choose the sources providing the respective images, to control the sources providing the images, to mark or select parts of the images and so on.

Furthermore, a user input, in particular a marking and/or a selecting of points or areas, on one of the images is performed, in particular automatically performed, on at least one adjacent and/or one overlapping image.

Other advantages and details of the invention will be appreciated from the following description of presently preferred embodiments together with the attached drawings.

BRIEF DESCRIPTION OF THE DRAWINGS

In the drawings:

FIG. 1b is a schematic view of a man-machine-interface (MMI) comprising display means, which is used with the surveying instrument of FIG. 1a;

FIG. 2a is a schematic view of a possible arrangement of images on display means at a surveying instrument or at a remote controller according to an embodiment of the invention;

FIG. 2b is a schematic view of another possible arrangement of images on display means of a surveying instrument according to another embodiment of the invention;

FIG. 2c is a schematic view of still another possible arrangement of images on display means at a surveying instrument or at a remote controller according to an embodiment of the invention;

FIG. 3 is a schematic view of a process changing the arrangement of images on display means according to another embodiment of the invention;

DETAILED DESCRIPTION

The invention will be described on the basis of presently preferred embodiments together with the attached figures. However, the invention is not limited to the described embodiments, but is merely defined by the scope of the attached claims.

Figure 1A:
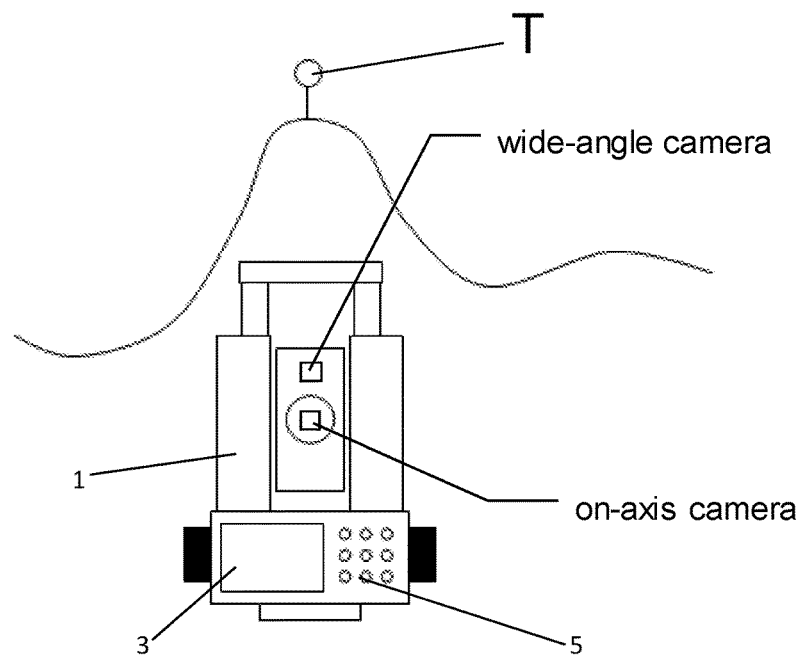
FIG. 1a is a schematic view of a surveying instrument according to the invention positioned in a measurement scenery.

FIG. 1a schematically shows a surveying instrument 1 according to the invention, which is placed in a measurement scenery. Among other components, the surveying instrument 1 includes a wide angle camera (WAC) having a comparatively wide field of view and no or low optical zoom factor and an on-axis camera (OAC) being integrated into the optical axis of the telescope of the surveying instrument. Both these cameras provide a continuous video stream. While the wide angle camera provides an overview image 9 of the whole measurement scenery, the on-axis camera provides an image 7 of a sector of the overview image, being in the field of view of the telescope. Therefore, usually, as will be explained later, the sector image 7 has a substantially higher magnification factor that the overview image. The cameras may be arranged such that their optical axes and/or aiming axes are in parallel and nearly collimate at a target point T in far distance.

Figure 1B:
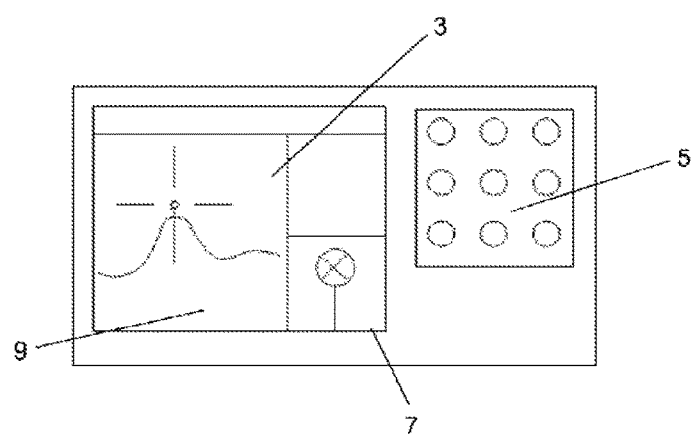

Furthermore, the surveying instrument comprises a man-machine-interface (MMI) which among other components has display means 3 as well as a keyboard 5. A not shown controlling unit is used for converting the image signal data of the WAC and the OAC and for combining the two video stream images 7, 9 in one picture which is displayed on the display means 3, as can be seen from FIG. 1b. Image 9 is provided by the WAC while image 7 is provided by the OAC. As can be seen from FIG. 1b, images 7 and 9 are arranged in an adjacent manner on the display means 3.

Via the keyboard 5 it is possible to control the presentation on the display means, for example to control the size of the single images 7, 9, the kind of arrangement of the single images 7, 9, control the images presented, choose the sources providing the images such as the WAC and the OAC, control the WAC and the OAC and so on. Additionally, the input unit can be a touch display. Therefore, some of the above controls can be effected directly via the touch display instead of using the keyboard.

For sake of simple presentation, in the following FIGS. 2a to 4, merely the display 3 is shown and other components of the MMI are omitted.

FIGS. 2a to 2c show different arrangements of images 7, 9 on the display means 3, which are provided by two different cameras which are named as camera 1 and camera 2. As can be seen from FIG. 2a, image 7 from camera 1 can be laid over the second image 9 from camera 2 such that it is arranged at the position of the target point in image 9. Assuming that camera 1 is the OAC providing a magnified image and camera 2 is the WAC providing an overview image of the measurement scenery, this way of presentation enables a direct and real time recognition of the correct target point in the proper location of the overview image. Another advantage of this kind of presentation is that the overview image has the largest possible size on the display means. Hence, high precise aiming onto a specific target point is enabled by looking onto displayed image 7 provided by the OAC, but anyway, at the same time, the user may also remain an overview of the scenery by considering image 9 (of the WAC) being displayed around the OAC-image. Particularly, image 7 may be laid over image 9 in such a way that the aiming axes (optical axes) of both cameras (WAC and OAC) coincide at the same point on the combined and merged picture being displayed.

FIG. 2b shows an arrangement of the images 7, 9 where image 7 from camera 1 is arranged adjacent to image 9 of camera 2. This alternative kind of presentation can be useful in case it is necessary to maintain the target point area in the overview image 9, for instance, if there is a plurality of similar objects resembling the target point object close to each other.

FIG. 2c shows another possible arrangement of the two images 7, 9 on the display means 3. Here, image 7 from camera 1 is laid over the overview image 9 from camera 2, but is arranged in a corner of the latter. Thus, the full display size is available for the overview image while the sector of the target point is fully visible in the overview image 9 as well as in the magnified image 7.

While in the description of FIGS. 2a to 2c it was assumed that camera 1 is an OAC and camera 2 is a wide angle camera, it is to be noted that other sources can be used as cameras 1 and 2 instead. For instance one of the cameras can also be a camera for automatic target recognition (ATR-camera). Such cameras usually are used in order to properly and automatically align with a reflector. Particularly, the ATR-camera may be integrated in the telescope and built for detecting in a specific wavelength range (e.g. infrared). Also, both images can be provided from the same camera, but one of the image signal data can be modified for instance by digitally zooming and/or by other image processing methods and/or by selecting one single color-channel or an infrared channel.

By pressing directly on the overview image 9 on a touch display, e.g. with a finger, the corresponding area of the overview image is magnified in the image 7 as shown in FIGS. 2a to 2c.

FIG. 3 shows a schematic view of an operating process in which the presentation on the display can be changed from the two image presentation shown in the upper display means to a one image presentation. According to this embodiment, the display means 3 is embodied in the form of a touch display. When touching image 7 provided by camera 1 (OAC) in a defined way, e.g. twice within a short time period (double click), the image is extended to the full size of the display means 3 as can be seen in the lower display. Accordingly, image 9 of camera 2 (WAC) is then faded out. By pressing a specified button on the keyboard 5 or touching the screen in a defined way (e.g., typing on a displayed button or a certain area on the screen), the previous arrangement is restored.

Figure 4:
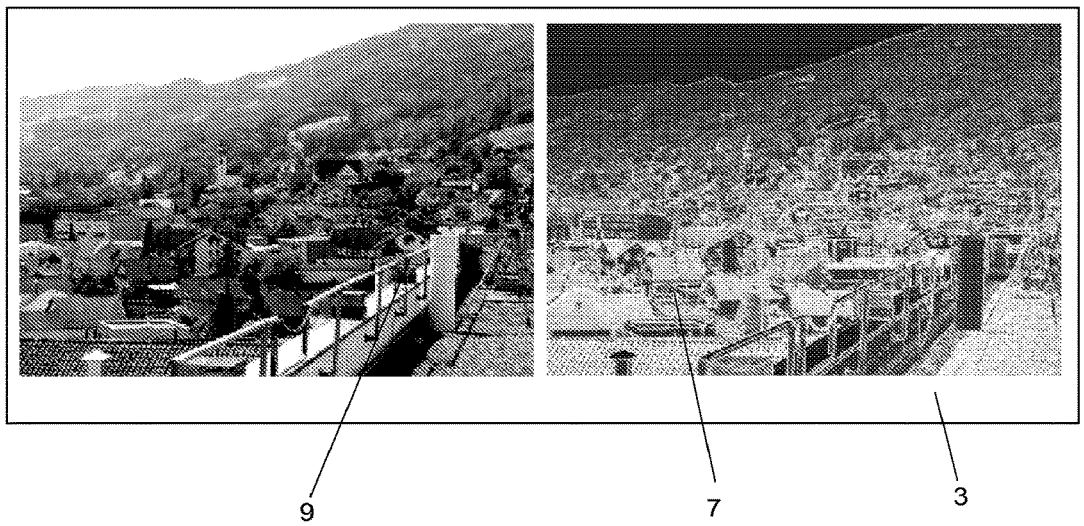
FIG. 4 is a schematic view of an arrangement of two images, one being a measurement scenery, the other one being an edge presentation of the measurement scenery in the first image.

FIG. 4 shows a schematic view of display means 3 presenting two images 7, 9. Both images 7, 9 are video stream images and originate from the same source. They show the same sector of the measurement scenery while image 7 was digitally converted to an edge presentation. A semi-transparent overlapping of both images, for highlighting regions of interest, is possible as well.

While some of the presently preferred embodiments of the invention have been described in the above, it is to be noted that alternative and additional modifications to the described embodiments are possible.

While according to the described embodiments, the MIMI is provided in the form of a remote control, alternatively the MIMI can be provided directly at the surveying instrument or can be implemented in the surveying instrument in the form being visible in the telescope eyepiece.

In the embodiments, the image sources are a wide angle camera and/or an on-axis camera. Additional or alternative sources such as a camera for automatic target recognition, different wavelength channels of the same video stream, different zoom factors of the same video stream may be used to provide additional or alternative image information. Furthermore, the image source may be formed by just one single camera. In this case the image provided by the one camera may be altered by digitally or optically zooming into a sector of the image, or by others such as the ones described in the following paragraph.

Furthermore, the images presented on the display means may be altered by changing color channels or changing the kind of the image presentation, for instance to an edge presentation, an infrared presentation or a night vision presentation. Furthermore, particularly adding additional information such as a reticle, distance information, image counters to the respective images is also possible. While in the embodiments described above, video stream images are used, alternatively static images or a combination of both may be used. Using simultaneous video stream images enables an actual real time determination of the measurement scenery. Alternatively, it is possible to use a static overview image together with a video stream of an OAC. In this case the overview image is useful for purpose of orientation.

Furthermore, the number of provided images displayed on the display means is not limited to two but can be more than two, depending on the requirements. For instance any of the images 7 or 9 in FIG. 4 can be supplemented by a magnification of a target point sector such that an additional image is provided or in a manner corresponding to the presentation of FIG. 2a.

Furthermore, it may be considered to combine one or more of the video streams of the cameras at the surveying instrument (WAC, OAC, ATR) with that of another camera located in a different position (controller camera). In this case the images from the WAC, OAC and/or ATR as well as those of the controller camera may be shown on the display means.

Furthermore, it is possible to use more display means. For instance one display may be provided at the surveying instrument while another display may be provided on the remote controller. In this case, both displays may show the same picture, or may show different pictures. For instance, the display on the surveying instrument may show the video streams from the WAC and/or the OAC, while the display of the remote controller may show the picture of the display on the surveying instrument plus additional images. Furthermore, there can be a possibility that the user individually handles each single image. For instance zooming, exposuring, marking, selecting or coloring might be done via a keyboard or via a touch display or via other control means. Moreover, a change in one image can automatically and/or manually be transferred to an at least second image.

Furthermore, a user input on one of the images can be updated, in particular automatically updated, in a second or in more images.

Additionally, there can be a possibility to link and change the images to foreseen areas on the display means.

Furthermore, several similar or different video-streams (dynamic sequences of images) or images (static images) can be displayed on one display, but each of the video-streams or images can be overlaid with additional information such as design data, prism information, measurement values, lines, points, areas and/or crosshairs.

Advantages provided by the invention are that, since at least two video-streams or static images or a combination thereof can be displayed simultaneously on display means of a surveying instrument, there is no more need to switch between video-streams from different cameras or the same camera but with different zoom factors. A possible offset of the optical axes of the camera may already be considered for a simultaneously displaying. Therefore, a very fast and accurate aiming of a target point by the surveying instrument is possible. The overview and the detail of the scenery are displayed at once. Furthermore, the simultaneous display of multiple video-streams enables the proper selection of the target points, for instance for measurements on prisms or for reflectorless measurements.

What is claimed is:

1. A theodolite or total station comprising:
  a base;
  an aiming structure being swivelable in two directions with respect to the base and including:
    an objective optical system defining an aiming axis; and
    at least a first camera in a direction of the aiming axis, wherein the at least first camera is provided as an on axis camera that is integrated into the aiming structure and that is seeing through the objective optical system, wherein the first camera has an optical magnification factor and provides at least a first image signal; and
    a wide angle camera with lower optical magnification factor as a second camera that is integrated into the aiming structure providing a second image signal and defining an optical axis, wherein the first and second cameras are arranged such that the optical axis and the aiming are in parallel;
  a display; and
  a controller being adapted so that the first image signal and the second image signal are processed in order to generate image signal data so that a first video stream and a second video stream are displayed simultaneously on the display, wherein the first video stream corresponds with the first image signal and the second video stream corresponds with the second image signal, wherein each of the first video stream and the second video stream represent a real time video stream, wherein the first video stream is a magnification of a detail of the second video stream being an overview video stream, and the first video stream from the on axis camera is overlaid with a reticle indicating the aiming axis, wherein a positional relationship between the aiming axis and the optical axis is processed by the controller for simultaneously displaying the first and the second video streams.

2. The theodolite or total station according to claim 1, wherein:

the first video stream from the on axis camera is displayed laying over the second video stream from the wide angle camera in such a way that it is displayed in a central region of the display; and an offset from the aiming axis to the optical axis is considered for simultaneously displaying the first video stream and the second video stream.

3. The theodolite or total station according to claim 1, wherein:

the at least first image signal is processed on side of the surveying instrument and the at least first and second video streams are displayed on the display at the surveying instrument as one single video stream and/or the generated image signal data is transferred to a remote controller and the video streams corresponding to the generated image signal data are displayed on display at the remote controller, or the at least first image signal is transferred in parallel to the remote controller, processed on side of the remote controller so as to generate the image signal data and the at least first and second video streams are displayed on the display at the remote controller.

4. The theodolite or total station according to claim 1, wherein the at least first and second video streams corresponding to the at least first image signal are arranged on the display in an adjacent manner.

5. The theodolite or total station according to claim 1, wherein one or some of the at least first and second video streams corresponding to the at least first image signal are arranged in a manner to partly and/or fully overlap one or some of each other.

6. The theodolite or total station according to claim 1, wherein an overlapping of the at least first and second video streams is generated by displaying at least one of the video streams in the foreground in a semi-transparent manner.

7. The theodolite or total station according to claim 1, wherein at least one of the at least first and second video stream is provided in defined color-channels and/or in adapted representation modes, in particular adapted by image processing.

8. The theodolite or total station according to claim 1, wherein the display is implemented as an electro optical viewer.

9. The theodolite or total station according to claim 1, wherein:

the controller is adapted to process information from one or more wavelength channels; and/or the controller comprises input means for manually adapting the arrangement of the video streams and for marking and/or selecting points and areas.

10. The theodolite or total station according to claim 1, wherein a user input on one of the video streams is performed on at least one adjacent and/or one overlapping video stream.

11. The theodolite or total station according to claim 1, wherein a marking and/or selecting points or areas on one of the video streams is automatically performed on at least one adjacent and/or one overlapping video stream.

12. The theodolite or total station according to claim 1, wherein the optical axis of the first camera is coaxial to the aiming axis.

13. The theodolite or total station according to claim 1, wherein an offset from the aiming axis to the optical axes of the on axis camera and/or the wide angle camera is considered for simultaneously displaying the first video stream and the second video stream.

14. The theodolite or total station according to claim 13 wherein the first video stream from the first camera is displayed laying over the second video stream from the wide angle camera in such a way that the optical axes of the first camera and the wide angle camera coincide at the same point on the display.

15. The theodolite or total station according to claim 1, wherein:

a target point is defined by pointing of the aiming axis, and the first video stream is laid over the second video stream at the position of the target point in the second video stream.

16. The theodolite or total station according to claim 1, wherein the first camera is configured to provide the first image signal with a selectable optical magnification factor.

17. The theodolite or total station according to claim 1, wherein the first and the second video stream are displayed on the display in such a way that the location of a target point defined by the pointing of the aiming axis is simultaneously recognizable in the first and the second video stream.

18. The theodolite or total station according to claim 1, wherein the second video stream from the wide angle camera is overlaid with a reticle indicating a target point defined by the pointing of the aiming axis.

* * * * *